United States Patent [19]
Watzke et al.

[11] Patent Number: 5,627,115
[45] Date of Patent: May 6, 1997

[54] COLORED BOROSILICATE GLASS

[75] Inventors: Eckhart Watzke; Andrea Kämpfer; Thomas Kloss; Gerhard Kemmler, all of Jena, Germany

[73] Assignee: JENAer Glaswerk GmbH, Jena, Germany

[21] Appl. No.: 512,157

[22] Filed: Aug. 7, 1995

[30] Foreign Application Priority Data

Aug. 10, 1994 [DE] Germany .................. 44 28 235.4

[51] Int. Cl.⁶ .................. C03C 3/091; C03C 4/08
[52] U.S. Cl. .................. 501/65; 501/66; 501/905
[58] Field of Search .................. 501/65, 66, 905

[56] References Cited

U.S. PATENT DOCUMENTS

| | | |
|---|---|---|
| 1,830,902 | 11/1931 | Hood . |
| 4,116,704 | 9/1978 | Boyd et al. .................. 501/66 |
| 4,870,034 | 9/1989 | Kiefer .................. 501/66 |
| 5,258,336 | 11/1993 | LaMastro et al. .................. 501/66 |

FOREIGN PATENT DOCUMENTS

| | | |
|---|---|---|
| 0510542 | 10/1992 | European Pat. Off. . |
| 0077144 | 5/1985 | Japan .................. 501/95 |

OTHER PUBLICATIONS

"Chemical Abstracts", vol. 104, No. 16, Apr. 21, 1986, Abstract No. 134720, p. 297.

"chemical Abstracts", vol. 116, No. 2, Jan. 13, 1992, Abstract No. 10309k, p. 232.

"Chemical Abstracts", vol. 119, No. 8, Aug. 23, 1993, Abstract No. 78121k, p. 367.

"Database WPI", Week 07, Derwent Publications Ltd., London, GB, Jan. 9, 1984.

"Database WPI", Week 36, Derwent Publications Ltd., London, GB, Jul. 23, 1986.

*Primary Examiner*—Mark L. Bell
*Assistant Examiner*—Louis M. Troilo
*Attorney, Agent, or Firm*—Walter Ottesen

[57] ABSTRACT

The invention relates to brownish, brown to black colored borosilicate glasses which have stepped grades of transmission in the NIR range or are fully non-transmitting. The borosilicate glass, primarily the borosilicate glass 3.3, is melted with defined additives of titanium carbide and/or metallic silicon. The glasses produced in accordance with the invention are to be used as filters, glass vessels and/or decorative colored glass in construction and for decorating because of their absorption/transmission characteristics. On the other hand, the glasses produced in accordance with the invention can also be used as absorbers in solar technology when the light transmissibility in the NIR/IR range is sufficiently low.

3 Claims, 5 Drawing Sheets

COLORED BOROSILICATE GLASS

FIELD AND BACKGROUND OF THE INVENTION

The invention relates to a colored borosilicate glass having a transmission in the near infrared range (NIR), which can be stepped to complete non-transparency, and the synthesis composition (in percent by weight on oxide basis) of $SiO_2>78$, $B_2O_3>8$, $Al_2O_3$ 1.5 to 3.5 and alkali oxide>2.

The glasses are used especially as filters because of their absorption/transmission characteristic or as absorbers in solar technology if the light transmissibility in the NIR/IR range is sufficiently low.

It is known to color borosilicate glass in different ways by adding specific constituents. If glass with standardized characteristics is colored intensely, the disadvantage, however, often occurs with relatively large admixtures of coloring oxides (such as copper oxide, cobalt oxide, nickel oxide or manganese oxide) that important characteristics such as the expansion, the hydrolytic stability or the viscosity characteristics change to an impermissibly large extent.

It is furthermore not known to adjust stepped NIR transmissions with the above-listed coloring oxides and/or, in this way, to manufacture glass which is completely non-transmissible for sunlight.

SUMMARY OF THE INVENTION

It is an object of the invention to color borosilicate glasses, and primarily the internationally established "borosilicate glass 3.3", brownish, brown to black without changing to an impermissible extent characteristics standardized in accordance with DIN/ISO 3585.

This object is realized when the above-mentioned borosilicate glass synthesis composition contains 0.5 to 2.0 percent by weight titanium carbide and/or 0.05 to 0.5 percent by weight metallic silicon.

Accordingly, it is possible according to the invention to melt borosilicate glass, which is very rich in silicic acid and weak in alkali oxide, with titanium carbide and/or metallic silicon so that the borosilicate glass is brownish, brown to black.

The glass color can be adjusted in grades from brownish to black and, at the same time, the NIR transmission can be reduced stepwise to approximately 3.5 µm by utilizing TiC from 0.5 to 2.0 percent by weight or 0.05 to 0.5 percent by weight of Si°. In this way, the known water range (Wasserband) at approximately 2.75 µm up to admixtures of approximately 1% TiC is reduced and increased at greater TiC admixtures or a changed coloring mechanism is effective.

The most important glass characteristics are not changed because the metallic silicon is built into the glass network as silicon oxide and the titanium of the titanium carbide is built in as titanium oxide.

The additional small component of silicon oxide does not operate as a disturbance and the relatively large quantity of titanium oxide likewise does not constitute a disturbance because this component has a similar effect as $SiO_2$ on the glass characteristics such as, for example, the expansion.

Preferred synthesis compositions according to the invention result when either 0.05 to 0.5 Si(metallic) or alternatively 0.5 to 2.0 TiC are admixed to (in percent by weight on oxide basis) 79 to 81 $SiO_2$, 12 to 13 $B_2O_3$, 2 to 3 $Al_2O_3$, 3 to 4.5 $Na_2O$, 0.5 to 1.0 $K_2O$.

BRIEF DESCRIPTION OF THE DRAWINGS

The invention will be described more fully with reference to the accompanying drawings in which.

DESCRIPTION OF THE PREFERRED EMBODIMENTS OF THE INVENTION

In the following, the invention will be explained in greater detail with respect to five examples and the FIGS. 1 to 5 corresponding thereto.

The "borosilicate glass 3.3" is sold under various trademarks and has a chemical composition in the region percent by weight) $SiO_2$ 80 to 81%, $B_2O_3$ 12 to 13%, $Al_2O_3$ 2 to 3% and $Na_2+K_2O$ 4 to 5%. For Duran™, the following composition (in percent by weight) is given: $SiO_2$ 81%, $B_2O_3$ 13%, $Al_2O_3$ 2%, $Na_2O+K_2O$ 4%. These quantities are in accordance with the laboratory glass catalog number 50020/1991 of the manufacturer.

As a base glass (GG) for the Examples 1 to 5, the following glass composition in percent by weight was selected: $SiO_2$ 80%, $B_2O_3$ 13%, $Al_2O_3$ 2%, $Na_2O$ 4%, and $K_2O$ 1%. The quantity of 400 ppm $Fe_2O_3$ was admixed to the base glass as impurity.

The following were used as raw materials: quartz sand, boric acid, aluminum hydroxide, sodium carbonate and potassium carbonate and, as a refining agent, sodium chloride (1% $Na_2O$ as NaCl).

Melting was carried out in laboratory ovens in quartz crucibles (V=1 liter) at melting temperatures of 1620° C. to 1650° C. in a conventional manner at air atmosphere. The melting time was approximately 5 hours. The melts were homogenized.

| Examples | Base Glass (GG) + Admixture (percent by weight) | Glass Color (for a layer thickness of 1 mm) |
| --- | --- | --- |
|   | GG + 0.04% $Fe_2O_3$ | colorless |
| 1 | +0.5% TiC + 0.04% $Fe_2O_3$ | brownish |
| 2 | +1.0% TiC + 0.04% $Fe_2O_3$ | dark brown |
| 3 | +1.5% TiC + 0.04% $Fe_2O_3$ | black |
| 4 | +0.5% TiC | black |
| 5 | +0.2% Si° | brown |

Figure 1:
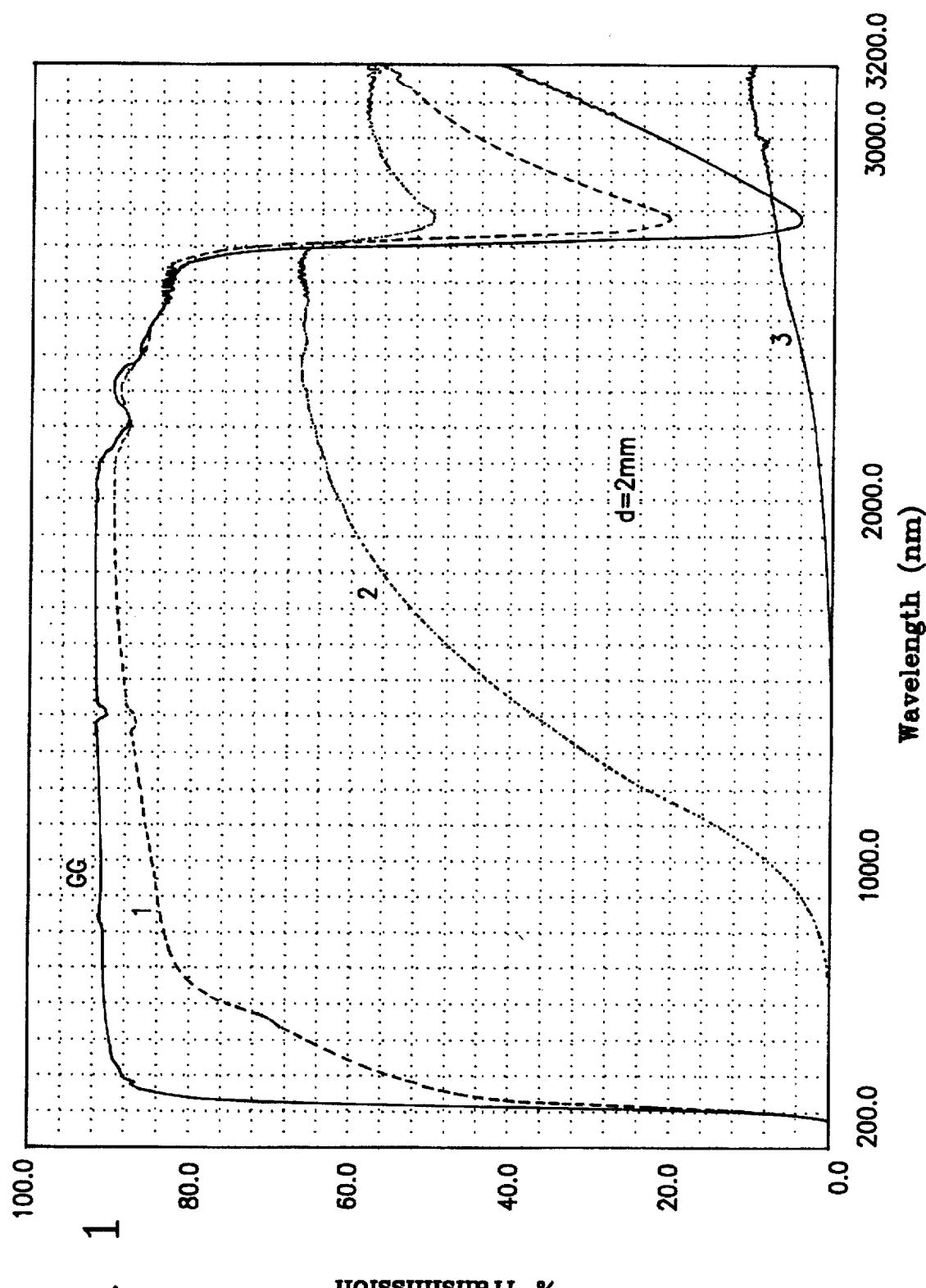
FIGS. 1, 2, 3, 4 and 5 are transmission curves for glasses according to the invention.

FIG. 1 shows the transmission curves for Examples 1, 2 and 3 in the range of 200 to 3200 nm for a 2 mm layer thickness compared to base glass GG. The glasses contain approximately 400 ppm $Fe_2O_3$ as an impurity. According to the invention, conventional, natural or purified raw materials can be used.

If, in accordance with the state of the art, for example, the Example 2 is melted with 0.2 percent by weight carbon additive (1.0 percent by weight TiC corresponds approximately to 0.2 percent by weight carbon), added as sugar, the brown coloring of the glass is not observed.

Figure 2:
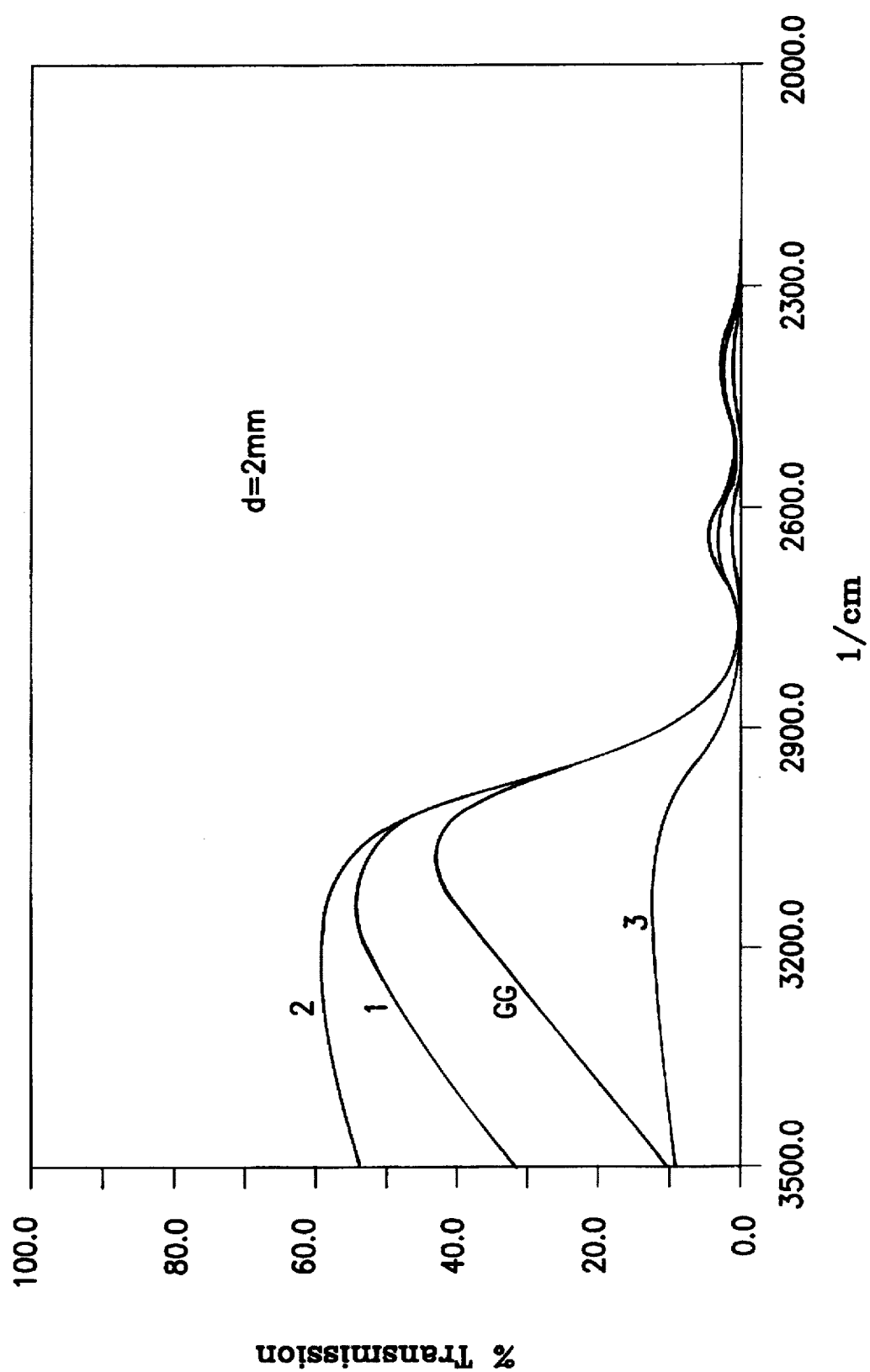

FIG. 2 shows the transmission curves of the same glasses, Examples 1, 2, 3 and GG for the NIR range of 2.86 to 5.0 µm which corresponds to the wave numbers 3500 to 2000 $cm^{-1}$ at a layer thickness of 2 mm.

Figure 3:
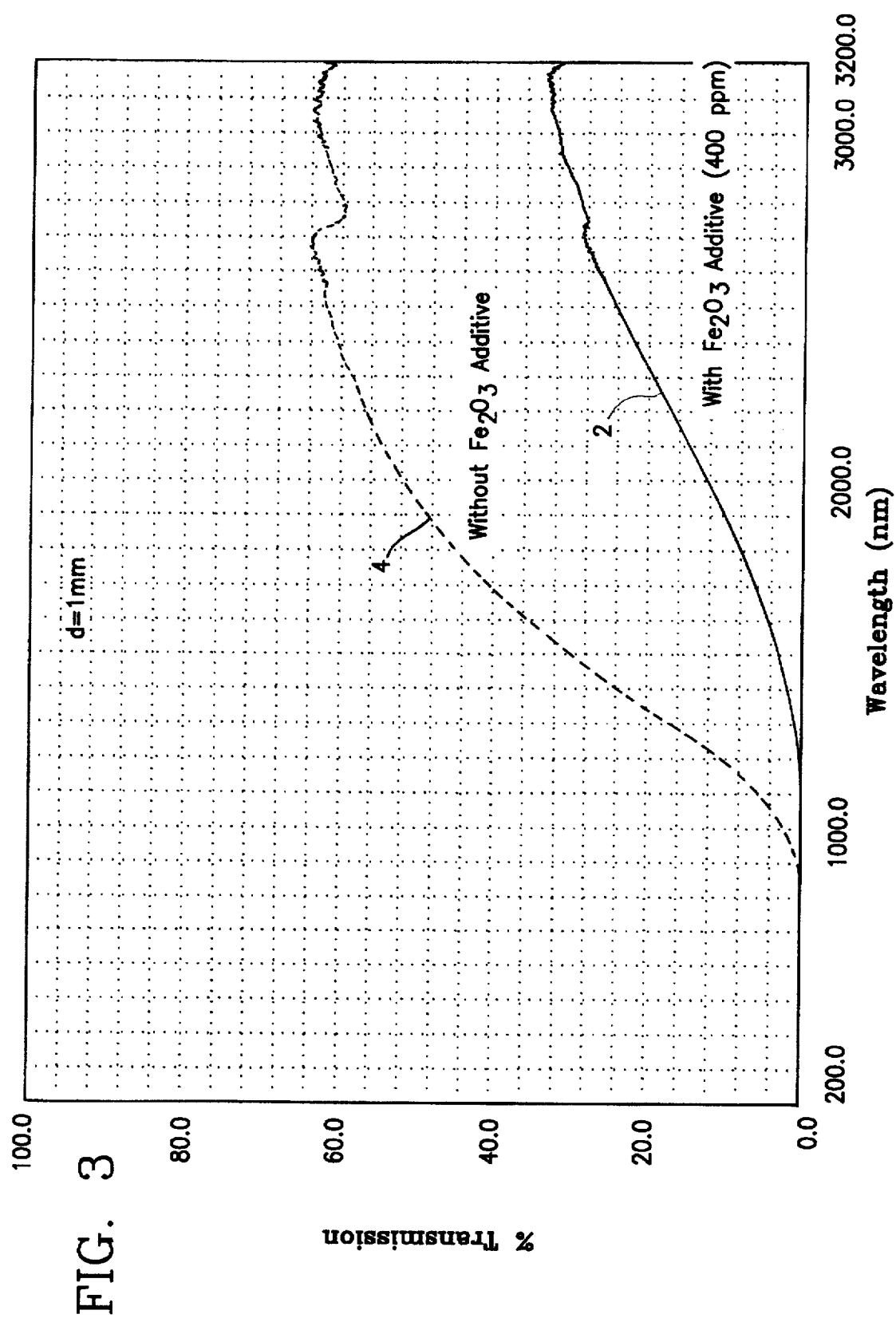

FIG. 3 shows the transmission curves of glasses 2 and 4 with different $Fe_2O_3$ content in the range of 200 to 3200 nm at a layer thickness of 1 mm.

Figure 4:
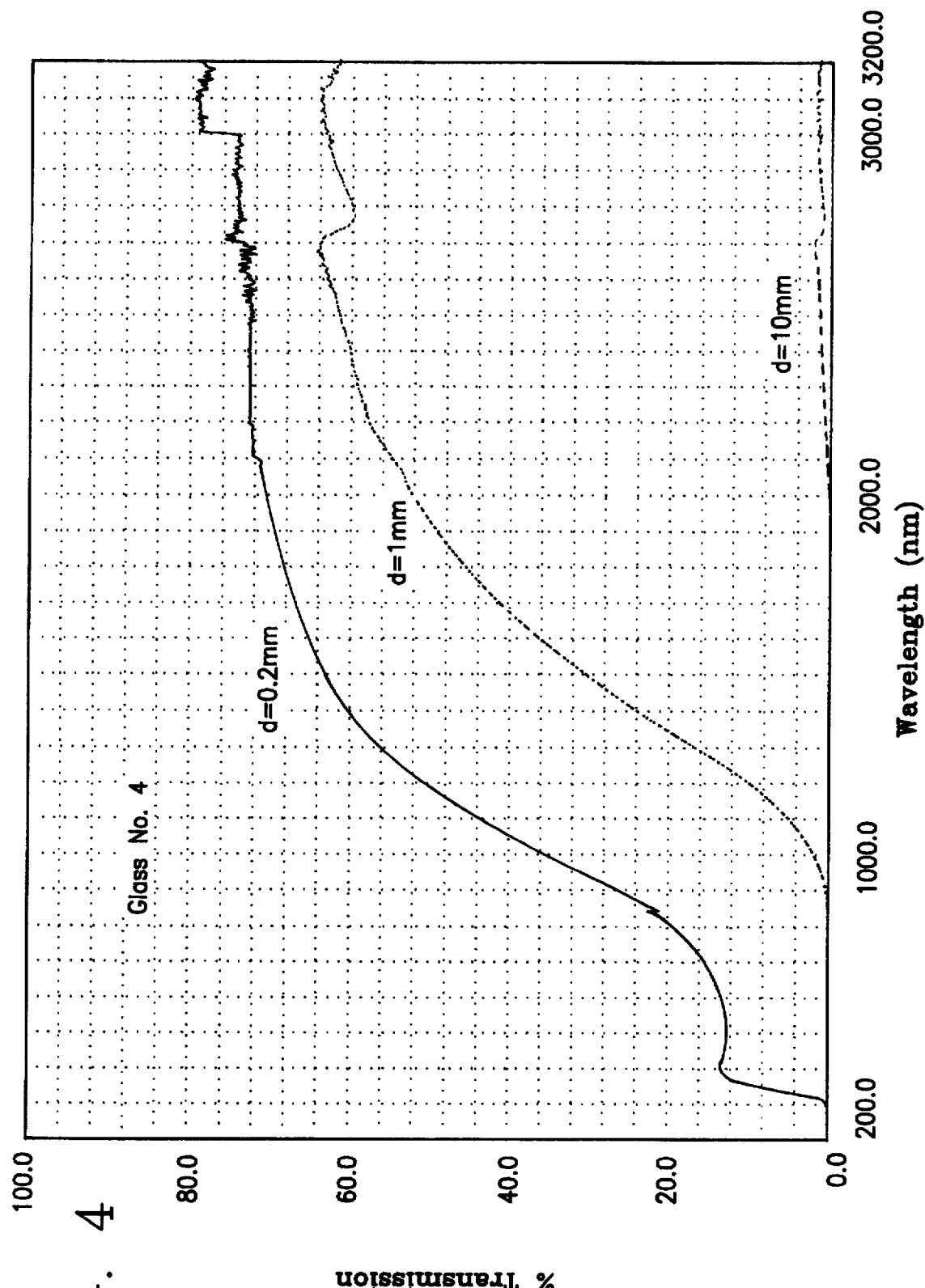

FIG. 4 shows the transmission curve of Example 4 in the range of 200 to 3200 nm at different layer thicknesses of the glass. The glass is completely black starting at a layer thickness of approximately 1 mm.

Figure 5:
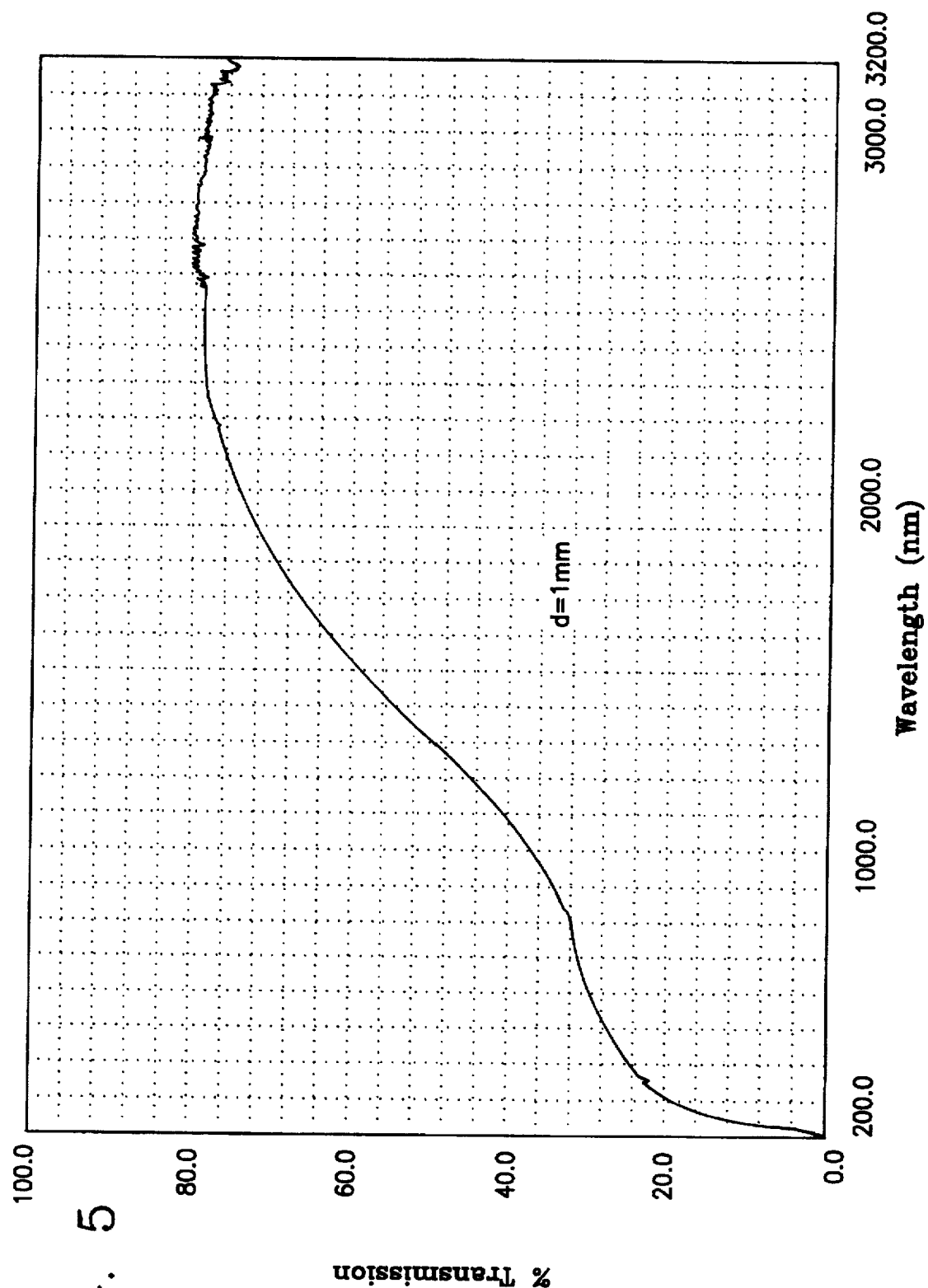

FIG. 5 shows the transmission curve of Example 5 in the range of 200 to 3200 nm for a 1 mm layer thickness. The glass is brown.

It is to be understood that the foregoing description is that of the preferred embodiments of the invention and that various changes and modifications may be made thereto without departing from the spirit and scope of the invention as defined in the appended claims.

What is claimed is:

1. A colored borosilicate glass composition comprising (in percent by weight on oxide basis) $SiO_2 > 78$; $B_2O_3 > 8$; $Al_2O_3$ 1.5 to 3.5; alkali oxides>2, having a transmission in the near infrared radiation (NIR) range with a glass exhibiting a color from brown to black while the NIR transmission is correspondingly reduced to complete non-transparency and further comprising (in percent by weight on oxide basis) 0.5 to 2.0 percent by weight titanium carbide (TIC) and/or 0.05 to 0.5 percent by weight silicon (metallic).

2. A colored borosilicate glass composition according to claim 1 comprising (in percent by weight on oxide basis):

| | |
|---|---|
| $SiO_2$ | 79–81 |
| $B_2O_3$ | 12–13 |
| $Al_2O_3$ | 2–3 |
| $Na_2O$ | 3–4.5 |
| $K_2O$ | 0.5–1.0 |
| Si(met.) | 0.05–0.5. |

3. A colored borosilicate glass composition according to claim 1 comprising (in percent by weight on oxide basis):

| | |
|---|---|
| $SiO_2$ | 79–81 |
| $B_2O_3$ | 12–13 |
| $Al_2O_3$ | 2–3 |
| $Na_2O$ | 3–4.5 |
| $K_2O$ | 0.5–1.0 |
| TiC | 0.5–2.0. |

* * * * *

UNITED STATES PATENT AND TRADEMARK OFFICE
CERTIFICATE OF CORRECTION

PATENT NO. : 5,627,115

DATED : May 6, 1997

INVENTOR(S) : Eckhart Watzke, Andrea Kämpfer, Thomas Kloss and Gerhard Kemmler It is certified that error appears in the above-identified patent and that said Letters Patent is hereby corrected as shown below:

On the title page, at [56] OTHER PUBLICATIONS: please delete ""chemical Abstracts", and substitute
-- "Chemical Abstracts" -- therefor.

In column 2, line 14: between "region" and "percent" please insert -- of (in -- therefor.

In column 2, line 16: please delete "$Na_2 + K_2O$" and substitute  -- $Na_2O + K_2O$ -- therefor.

In column 3, line 19: please delete "(TIC)" and substitute -- (TiC) -- therefor.

Signed and Sealed this

Eighth Day of July, 1997

*Attest:*

BRUCE LEHMAN

*Attesting Officer*     *Commissioner of Patents and Trademarks*